UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA

PROCESS OF SMELTING ALUMINUM ORES.

No. 906,172.      Specification of Letters Patent.      Patented Dec. 8, 1908.

Application filed September 14, 1907. Serial No. 392,838.

*To all whom it may concern:*

Be it known that I, FRANK J. TONE, of Niagara Falls, Niagara county, New York, have invented a new and useful Process of Smelting Aluminum Ores, of which the following is a full, clear, and exact description.

This invention refers to the smelting of aluminum ores, particularly to silicates of aluminum and has for its object the production therefrom of new and useful substances containing silicon or aluminum or both of these elements.

Aluminum silicate is an ore of aluminum of wide occurrence and is the basis of all true clays. I have discovered that by smelting this ore in the electric furnace together with a suitable reducing agent, it is possible to reduce the silicon without reducing the aluminum and that by proper regulation of temperature it is possible to fuse the remaining aluminum compound to a form of fused aluminum oxid, having great hardness and valuable abrasive qualities. I have also discovered that the reduction of the silicon is facilitated by adding to the mixture base metal or ore such as iron or manganese which alloys with the silicon and makes the reduction of the latter more complete. In the carrying out of this process I take any form of aluminum silicate, such as kaolin, preferably first calcining it to drive off the combined water. With the kaolin is mixed a reducing agent, such as carbon, and a base metal, such as iron. I have found the following proportions of mixture to give satisfactory results: calcined kaolin, 222 parts; carbon 48 parts; iron 56 parts. The proportions of this mixture may, however, be varied. An excess of carbon is sometimes necessary in order to complete the reduction, and the iron may be added in still greater proportion, making an iron silicid of correspondingly greater iron content. If the base metalliferous material is added in the form of an oxid, additional carbon must be added to reduce this to metallic form. When this charge is smelted in the electric furnace, a reaction occurs in accordance with the following equation:

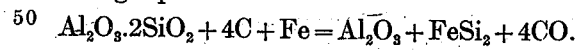

$$Al_2O_3.2SiO_2 + 4C + Fe = Al_2O_3 + FeSi_2 + 4CO.$$

The aluminum silicate is dissociated and the silicon is reduced to elemental form uniting with the iron to form an iron silicid. There being insufficient carbon to reduce the aluminum, this does not part with its oxygen and is transformed into fused oxid of aluminum of crystalline structure.

Any ordinary form of arc furnace with vertical electrodes depending into the furnace pot or chamber is suitable for carrying out this process. The charge mixture is fed into the furnace around the electrodes and as the finished product accumulates and builds up under the arc, the electrodes are raised to allow the finished product to form a pig or ingot of considerable size. After a sufficient amount of mixture has been smelted to form an ingot of a size convenient to handle, the furnace run is stopped and the fused mass is allowed to cool. The iron silicid being heavier than the alumina, has a tendency to settle to the bottom of the furnace from which it may be tapped at intervals during the run. It also agglomerates in nodules of greater or less size throughout the finished product. After the ingot has cooled it is broken up and the silicid is separated from the alumina. This may be done in various ways. Preliminary separation may be made by hand after which I prefer to crush the finished product and separate the grains of alumina from the silicid by concentration. The separation may be facilitated if the silicon and base metal are combined in proper proportion to form a disintegrating alloy. I have found that by adding the base metalliferous material as manganese or manganese ore in the proportions to form a silicid containing 45 to 50 per cent. manganese the alloy is very friable and on exposure to air tends to disintegrate into a fine powder. An iron silicid containing 35 per cent. iron is of similar character. Other disintegrating alloys may be produced in similar manner and for the same purpose of facilitating separation of finished products.

The silicids produced in this process are useful for various purposes, such as refining of iron and steel, and the alumina is useful as an abrasive and also as an ore for the production of metallic aluminum.

I claim:

1. The method of transforming aluminum silicate into a material possessing great hardness and abrasive properties, which consists in making a mixture of aluminum silicate, carbon and base metalliferous material, the amount of carbon being sufficient to reduce the silicon but insufficient to reduce the aluminum, and the amount of base metalliferous material being sufficient to form a disintegrating alloy with the reduced silicon, subjecting said mixture to electrically developed heat sufficient to dissociate the aluminum silicate, to reduce the silicon and combine it with the base metal, and to fuse the alumina, allowing it to cool, and disintegration to occur and then separating the fused alumina and the silicon alloy of the resultant product.

2. The method of transforming aluminum silicate into a material possessing great hardness and abrasive properties, which consists in making a mixture of aluminum silicate, a base metalliferous material, and a reducing agent in such proportions that the silicon will be reduced without reducing the aluminum, the proportions of the base metalliferous metal being such as to form a disintegrating alloy with the reduced silicon, subjecting the mixture to electrically developed heat, and allowing the mixture to cool and disintegrating action to occur, and then separating the fused alumina and the silicon alloy of the resultant product.

In testimony whereof, I have hereunto set my hand.

FRANK J. TONE.

Witnesses:
CHARLES CHORMANN,
S. S. DIEMER.